Patented May 31, 1949

2,471,496

UNITED STATES PATENT OFFICE 2,471,496

RECLAIMING SCRAP OF NATURAL RUBBER MIXED WITH BUNA-S

Robert L. Randall, St. Louis, Mo., assignor, by mesne assignments, to Midwest Rubber Reclaiming Company, East St. Louis, Ill., a corporation of Delaware No Drawing. Application July 14, 1945, Serial No. 605,183

7 Claims. (Cl. 260—5)

The present invention has as its object the perfection of a process for reclaiming waste rubber scrap, and particularly old automobile and truck tires, and to a practical and commercial process for making the rubber content thereof available for re-use.

The process herein disclosed deals specifically with the reclaiming of stocks in which natural rubber is intermingled with the Buna-S rubber also known as GRS.

While commercial and practical methods of reclaiming rubber tire scrap and other rubber scrap which contain natural rubbers are well known and while more or less success has been achieved in reclaiming tires and other articles made of various synthetic rubbers, a very real problem has been presented to the industry in the reclaiming of stocks such as tire scrap which contain both natural and synthetic rubbers, particularly what is known as Buna-S or GRS, as the reactions of these materials in the reclaiming processes are quite distinct. This is mainly due to the fact that processes which will soften the Buna-S to the requisite degree render the natural rubbers too soft and mushy to make a satisfactory reclaim with an acceptable plasticity and other properties. Conversely, processes which soften the natural rubber to the proper degree will leave the Buna-S hard and unworkable. As a consequence, if the reclaimer employs a process which gives a commercially satisfactory reclaimed natural rubber, the losses and tailings due to the unreclaimed Buna-S particles result in excessive waste.

It is uneconomical to attempt to separate the component parts of tires which are made of combination of Buna-S and natural rubbers, although in many cases this has been the only solution of the problem which has been found by many reclaimers.

The process which is disclosed herein has been found, after extensive tests in the laboratory and also in actual commercial operations carried on at a large scale, to provide a means by which it is possible to treat scrap rubber and particularly scrap tires having both types of rubbers in their make-up in a single operation, and to obtain therefrom satisfactory reclaim with a minimum loss due to tailings and rejects. The process has the great advantage that it may be carried on with the usual factory routine and technique and except for the substitution of the reagents specified herein for ordinary reagents, the new process requires no appreciable change in factory practices.

The synthetic rubber which has been almost universally employed in tires since Pearl Harbor is what is known as GRS or Buna-S rubber. This is a copolymer of butadiene and styrene and is used in certain tires as the only rubber-like component. In other tires the Buna-S rubber is used in the tread, while the carcass contains natural rubber. In certain cases also natural rubber has been milled with the Buna-S rubber. This makes the perfection of a process which will reclaim any combination of both types of rubbers in varying proportions a valuable advance in this art. The problem is further complicated by the fact that it is impossible to determine the percentage of the two rubbers which may be present in batches of tires which are to be put through the reclaiming process. It is quite likely that these conditions will confront the tire reclaimer for a long period.

In evaluating the reclaim various tests are more or less standard, but the generally accepted standard is what is known as the Mooney plasticity test (see Industrial and Engineering Chemistry, vol. 6, p. 147, 1934). This method of testing plasticity is well known to those skilled in the art and is a fair method of determining this important characteristic of the finished product. Reclaims obtained by the process disclosed herein from a great variety of scrap rubber containing both natural and Buna-S rubbers have shown Mooney values ranging from over 30 to under 100 and any finished product coming within this range is a satisfactory reclaim and may be employed with excellent results in subsequent manufacturing operations. It will be apparent that a reclaim made from mixed stocks by this process may be held to much closer Mooney ranges than with previously known processes.

A further advantage of the process is the fact that much lower percentages of tailings are obtained. Tailings are the small particles of unreclaimed stock which detach themselves from the sheet of reclaim as it is made on the refiner. It is desirable to maintain a tailing production of under 6%. As indicated herein, the tailings resulting from the use of this process will run below 6% and in some cases with no tailings at all.

In carrying out the process, the usual procedure common in many reclaiming plants is employed. One such process will be described as exemplary.

If tire scrap is to be reclaimed, the beads are first removed from a miscellaneous batch of tires containing a wide variety of the two types of rubber discussed herein. The tires are then cut up and ground until all of the particles thereof will pass through a ¼" mesh, the said particles consisting of both rubber and fabric, cotton, rayon or the like. This ground scrap can then be defibered by mechanical means or by any well known chemical process. Or, if desired, the defiberization may be carried on simultaneously with the reclaiming process. In any case the rubber scrap is fed to a jacketed digester or an autoclave where it is thoroughly agitated with a relatively large body of water and the selected reagents which act to soften or "reclaim" the rubber. This digesting process is carried on for a number of hours until the reclaiming agents have fully acted upon the rubber. The digester is then emptied, the liquid contents removed by mechanical means well known and the reclaimed scrap is then washed to remove any traces of the free reagents. The scrap is then milled and refined, the latter process consisting in sheeting out the reclaim into very thin sheets which are wound up on a roll from which the stock is cut when the batch has been completely refined. It is during this refining process that the bits of unreclaimed rubber which constitute the tailings drop from the sheet.

During these latter operations, any filling agents, softeners, mineral rubbers or reagents may be added as called for by the customer's specifications. The resultant product is a uniform mass of reclaimed rubber of the proper plasticity and free of particles of unreclaimed rubber, or "pimples" as they are known in the trade.

In order to secure the results set forth, two new reclaiming agents are employed in combination, and while their action may not be capable of positive ascertainment, it has been found that they work exceptionally well in the reclaiming of mixed rubber scraps containing natural rubber and what has been defined as Buna-S or GRS rubber. The combination of reagents softens each component part of the mix satisfactorily. In the absence of the treatment specified, the crude rubber would be so soft and mushy as to make the whole batch unsuitable for the subsequent processing operations and for any useful purpose thereafter.

The two reagents employed are:

(1) The oil-like residue obtained as a by-product of gasoline refining by the clay tower adsorption process or what is known as the "Gray Tower" process of gasoline refining, which is described in Burk, Thompson, Weith and Williams, Polymerization, pp. 232-233. This oil-like residue is a mixture of unsaturated hydrocarbons with short aliphatic side-chains. These hydrocarbons consist of some aromatic, some naphthenic (cyclo-paraffines) and some cyclo-olefinic compounds. The unsaturation of these compounds is found partly in the ring structures, and partly in the aliphatic side-chains. The aliphatic side-chains consist of carbon and hydrogen only and usually do not contain more than three to four carbon atoms. In short this material can be defined as a mixture of compounds containing bi- and tri-cyclic fused ring structures with short aliphatic side-chains. The material has a very high iodine number, being in the range between 150 and 375 which is indicative of a high degree of unsaturation. It is ordinarily a thick, dark brown, viscous liquid sold by a number of petroleum refining companies and has a limited commercial value. An analysis of a typical oil of this type is as follows:

Specific gravity_____ .94 to .97
Boiling range (before decomposition) _____°C__ 170 to 350
Iodine value_____ 150-250
Non-volatile_____per cent__ 60-85

(2) The second reagent referred to above is essentially abietic acid and its equivalents. The commercial form of abietic acid which is used in the process is a yellow crystalline powder. For the purpose of this application, this second reagent may be referred to as abietic acid, although such expression when used herein is intended to include both commercial abietic acid and chemically pure abietic acid. This material is sometimes referred to as sylvic acid. It is not intended to exclude closely related diterpene carboxylic acids which have analogous molecular structures, such, for example, as abietinic acid, pimaric acid, sapinic acid and isomers of abietic acid.

It being understood that as it is practically impossible to determine the exact ratio of natural and Buna-S rubber which is in a batch, the exact proportions of the reclaiming resin and abietic acid or its equivalent cannot be fixed, but it is the intention to supply such proportions of the two reagents that will react properly with batches containing wide variations of natural and synthetic rubber to produce an end product in which both types of rubber have like or substantially equivalent plastic properties. This factor may, therefore, be determined by experimentation, but it has been the experience that the relative proportions of the abietic acid and the reclaiming resin will be advantageously modified with the varying proportions of natural and Buna-S scrap in the batch. As the percentage of natural rubber increases, the proportion of abietic acid should be increased.

The following illustrative examples are given, not with the intent of limiting the invention to the exact amounts, proportions or temperatures, but merely to give actual operative formulas which have given outstanding results in the reclamation of mixed Buna-S and natural rubber scrap. In actual commercial practice these figures have been found to give excellent results:

|  | Batch #1 | Batch #2 | Batch #3 |
| --- | --- | --- | --- |
| Ground Buna-S scrap | 750 parts | 1000 parts | 1500 parts. |
| Ground Natural Rubber Scrap. | 1500 parts | 1000 parts | 750 parts. |
| Water | 4000 parts | 4000 parts | 4,000 parts. |
| Abietic Acid | 3% or 67.5 parts. | 3% or 60 parts | 2% or 45 parts. |
| Reclaiming Resin | 10% or 225 parts. | 10% or 200 parts. | 10% or 225 parts. |
| Cook at 195° C | 9 hours | 9 hours | 9 hours. |
| Mooney Plasticity | 64 | 85 | 82. |
| Tailings | 3% | None | 2%. |

It will be observed that the Mooney plasticity is excellent and characteristic of the highest grade of reclaim.

The above examples were given for a standard aqueous digesting method, but the same reagents may be employed in the steam digesting process where the ground mixed scraps are treated in the presence of the two reclaiming agents in a steam heater and subjected to live steam at a predetermined temperature.

Examples of the extension of the invention to this reclaiming process are:

|  | Batch #4 | Batch #5 | Batch #6 |
|---|---|---|---|
| Buna-S scrap............parts.. | 85 | 30 | 40 |
| Natural Rubber Scrap.do.... | 15 | 70 | 60 |
| Abietic Acid............do.... | 1 | 15 | 9 |
| Reclaiming Resin........do.... | 14 | 3 | 30 |
| Temperature............°C.. | 140 | 190 | 250 |
| Time................hours.. | 20 | 10 | 1 |
| Mooney Plasticity............ | 40 | 60 | 72 |

Batch #4 was a mixed gum stock; #5 a miscellaneous mechanical goods scrap; and #6 a clicker block and gasket mixed scrap.

All six of the above batches treated in the manner described gave reclaims which are capable of being vulcanized into useful products having satisfactory physical properties.

It is oftentimes impossible, due to various causes, to determine the proportions of natural rubber and Buna-S in a commercial lot of scrap. The following is an actual example of the process as it has been successfully applied to mixtures of scrap containing both materials, but in unknown and undeterminable proportions.

Batch #7

| | |
|---|---|
| Ground whole tire scrap containing both natural rubber and Buna-S in unknown proportions. | 5,000 lbs. |
| Water | 9,110 lbs. |
| Reclaiming resin | 17% or 850 lbs. |
| Abietic acid | 3% or 150 lbs. |
| Heat at 190 lbs. pressure in a digester | 12½ hrs. |
| Mooney plasticity | 72 |
| Tailings | None |

The temperatures and times at which the reaction is carried out whether in a digester, potheater, or autoclave may be varied widely, but it will be understood that during the process the scrap is in contact with steam and that in general the higher the temperature the shorter the time required, and vice versa.

It will be seen that the process described herein has very substantial value in the rubber reclaiming industry and permits it to cope successfully with the problems which are presented by present day conditions in which the reclaimer finds himself with large stocks of tires and other used rubber articles which may contain wide variations in the proportions of the different types of rubbers contained therein. These problems have been created by the use of Buna-S in combination with natural rubbers, the scrap of which come to the reclaimer without any attempt at segregation with respect to the rubber constituents.

It may be stated that the resin reclaiming agent, i. e., the by-product of the "Gray process" of gasoline refining, has been found to possess very superior properties when used by itself in the reclaiming of natural rubber and synthetic rubber where the problem is not complicated by the joint presence of both types of rubber in a single stock. It is particularly valuable in the reclaiming of the butyl type synthetic rubbers and straight Buna-S rubber. This discovery is a very valuable one and is made the subject of my copending application Serial No. 631,481, filed Nov. 28, 1945. It is not intended to be dedicated hereby.

In conclusion it may be stated that the specific details of the process as disclosed herein are not intended to be construed as limiting the invention beyond the apparent scope of the claims. The process may be modified or improved upon without departing from the principles of the invention. It has been sought herein to give a full and adequate disclosure of the best known or preferred forms of the invention, and this disclosure is not to be considered in any other aspect.

What is claimed is:

1. The process of reclaiming mixed, previously vulcanized rubber scrap containing both natural rubber and an elastomer which is a rubbery copolymer of butadiene and styrene, comprising heating the said scrap with from 1 to 15% of abietic acid and from 3 to 30% of Gray Tower resin oil which is a residual by-product obtained in the refining of gasoline.

2. The process of reclaiming mixed, previously vulcanized rubber scrap containing both natural rubber and a synthetic rubber made by the copolymerization of butadiene and styrene, comprising heating said scrap in the presence of not in excess of 15% of abietic acid and not in excess of 30% of Gray Tower resin oil which is a by-product of the refining of gasoline and which has the following properties:

| | |
|---|---|
| Specific gravity | .94 to .97 |
| Boiling range (before decomposition) °C | 170 to 350 |
| Iodine value | 150–250 |
| Non-volatile per cent | 60–85 |

3. The process of reclaiming mixed, previously vulcanized rubber scrap containing both natural rubber and an elastomer which is a rubbery copolymer of butadiene and styrene, which comprises heat treating said scrap in the presence of not in excess of 15% of at least one diterpene carboxylic acid selected from the group consisting of abietic acid and resin acids which are isomers of abietic acid and not in excess of 30% of Gray Tower resin oil which is a residual by-product obtained in refining gasoline.

4. In a process of reclaiming rubber scrap which contains natural rubber and an elastomer which is a rubbery copolymer of butadiene and styrene, the steps of adding to said scrap not in excess of 15% of at least one diterpene carboxylic acid selected from the group consisting of abietic acid and resin acids which are isomers of abietic acid and not in excess of 30% of Gray Tower resin oil which is a residual by-product obtained in refining gasoline, and heat treating the mixture until both types of rubbers are rendered plastic to the degree that the product has a Mooney value between 30 and 100.

5. The process of reclaiming scrap containing natural rubber and an elastomer which is a rubbery copolymer of butadiene and styrene which comprises heating the scrap in comminuted condition in the presence of steam, not in excess of 30% of Gray Tower resin oil which is a by-product obtained in the refining of gasoline and not in excess of 15% of abietic acid.

6. The process of reclaiming scrap containing natural rubber and an elastomer which is a rubbery copolymer of butadiene and styrene which comprises heating the scrap in comminuted condition in the presence of steam, not in excess of 15% of at least one diterpene carboxylic acid selected from the group consisting of abietic acid and resin acids which are isomers of abietic acid, and not in excess of 30% of Gray Tower resin oil which is a by-product obtained in the refining of gasoline.

7. The process of reclaiming scrap containing natural rubber and an elastomer which is a rubbery copolymer of butadiene and styrene which comprises heating the scrap in comminuted condition in the presence of steam, from 1 to 15% of abietic acid and from 3 to 30% of Gray Tower resin oil which is a by-product obtained in the refining of gasoline.

ROBERT L. RANDALL.

REFERENCES CITED

The following references are of record in the file of this patent:

UNITED STATES PATENTS

| Number | Name | Date |
| --- | --- | --- |
| 2,008,102 | Hyman | July 16, 1935 |
| 2,324,980 | Kilbourne | July 20, 1943 |
| 2,423,033 | Le Beau | June 24, 1947 |